United States Patent [19]
Eilenstein-Wiegmann et al.

[11] Patent Number: 5,397,078
[45] Date of Patent: Mar. 14, 1995

[54] APPARATUS FOR ALIGNING AND SECURING PALLETS IN AN AIRCRAFT

[75] Inventors: Wilfried Eilenstein-Wiegmann; Guenter Vogg, both of Bremen, Germany

[73] Assignee: Deutsche Aerospace Airbus GmbH, Hamburg, Germany

[21] Appl. No.: 14,332

[22] Filed: Feb. 5, 1993

[30] Foreign Application Priority Data

Feb. 5, 1992 [DE] Germany .................. 42 03 168.0

[51] Int. Cl.[6] ............................................. B64C 1/20
[52] U.S. Cl. ................................ 244/118.1; 410/81; 411/112; 411/386; 244/161
[58] Field of Search ............... 244/118.1; 248/24, 25, 248/361 R; 410/80, 81, 90, 91; 411/112, 113, 386, 432, 104

[56] References Cited

U.S. PATENT DOCUMENTS

| | | | |
|---|---|---|---|
| 3,912,206 | 10/1975 | Jong | 244/118.1 |
| 4,232,497 | 11/1980 | Meshnig | 411/386 |
| 4,830,557 | 5/1989 | Harris et al. | 411/112 |
| 4,929,136 | 5/1990 | Mee | 411/112 |
| 5,028,189 | 7/1991 | Harley | 411/112 |
| 5,104,070 | 4/1992 | Johnson et al. | 244/161 |

*Primary Examiner*—Galen L. Barefoot
*Attorney, Agent, or Firm*—W. G. Fasse; W. F. Fasse

[57] ABSTRACT

A pallet that is initially not completely aligned with a support structure, such as support rails in the floor of an aircraft, is properly aligned by the function of an aligning and coupling device which has two sections interconnected by a coupling member, such as a screw bolt that can be tightened. One section is connected to the support and the other section is connected to the pallet. Relative movement at least in a radial direction of the components of one section permit an adjustment. The relative movement is preferably permitted in the radial and axial direction. The continued tightening of the two sections to each other provide the required alignment.

14 Claims, 6 Drawing Sheets

1

APPARATUS FOR ALIGNING AND SECURING PALLETS IN AN AIRCRAFT

FIELD OF THE INVENTION

The invention relates to an apparatus for aligning and securing pallets in an aircraft. Such pallets may carry seating arrangements for passengers, pallets carrying passenger related equipments, for example, separate cabins or the like. The securing apparatus includes a first section connectable to a support structure such as a floor, a second section connectable to a pallet, and a coupling for securing the two sections to each other.

BACKGROUND INFORMATION

Devices of the type described above are, for example, used for securing interior equipment to a floor structure inside an aircraft. Such interior equipment may include seating arrangements, cabin separation walls, kitchen equipment, and the like. For this purpose, the cabin floor structure forming a support for the equipment is provided with guide rails or support rails equipped for receiving one section of the connecting or securing apparatus. Screw connections are normally used for securing or attaching the connecting device to the support structure. The second section of the connecting apparatus is secured to the pallet, for example, also by means of screws. In order to connect the pallet to the floor, it is necessary to properly or even exactly align the two sections so that the coupling can interconnect the two sections of the securing device.

An exact alignment of the two sections and thus of the pallets is especially important where a plurality of pallets form the floor on which people are expected to walk. In such a case any gaps between neighboring pallets must be avoided to prevent accidents. Conventional devices for the just outlined purpose leave room for improvement since they do not satisfy the requirement for a precise alignment.

OBJECTS OF THE INVENTION

In view of the foregoing, it is the aim of the invention to achieve the following objects singly or in combination:

to provide a connecting device or mechanism that will permit a precise alignment of the two sections of the device to thereby also permit a proper alignment of pallets on a loading floor or the like;

to construct a connecting or securing device of the type described herein in such a way that the coupling force exerted, for example, by tightening a coupling screw is also utilized as an alignment force; and to construct a connecting device in such a way that it will prevent the formation of gaps between neighboring pallets that are connected by the device to a support floor or the like.

SUMMARY OF THE INVENTION

The connecting or securing device according to the invention is characterized in that it has two sections interconnectable by a coupling mechanism. One section, referred to as the first section herein, is connectable to the support, such as a rail or the like. The other section, referred to herein as the second section, is connectable to the pallet. The coupling mechanism comprises a housing with a conical space therein in which a conical member is received. The coupling mechanism further includes a coupling member, such as a screw bolt, which passes through one of the sections and engages a threading in either the housing or in the conical member. The conical space in the housing and the conical member are so-dimensioned that a certain play is provided between the housing and the conical member. Such a play permits a relative movement between the housing and the conical member at least in the radial direction and preferably also in the axial direction for permitting an initial rough alignment between the two sections and a further precise alignment in response to tightening the coupling member. As a result of such alignment the longitudinal axis of the first section, the longitudinal axis of the second section, and the longitudinal axis of the coupling member coincide at least approximately with each other. The housing with the conical space and the conical member may be part of either the first section or of the second section of the present coupling mechanism.

The combination of the conical member with a conical space in the housing makes it possible that the coupling member is easily inserted into a receiving opening that is preferably provided with lead-in ramps or slanting surfaces for guiding the coupling member into engagement with the housing or conical member, whereby deviations in the positions of the respective longitudinal axis can be compensated by a relative movement between the conical member and the housing. As a result, the receiving opening, for example, of a female threading in the housing or in the conical member can be positioned concentrically relative to the longitudinal axis of the coupling member. By rotating the coupling member, for example, when the coupling member has a male external threading, the latter grips into the female threading of the housing or conical member. This interaction further enforces the desired alignment, not only of the connecting mechanism components, but also of the pallet itself. Thus, the alignment of the pallet results in a proper positioning of the pallet relative to the support structure so that a plurality of pallets will also be properly aligned with each other without the occurrence of gaps between neighboring pallets.

An especially simple construction of the individual elements and of the present coupling mechanism is achieved when the conical member and the conical space in the housing are part of the first section that is secured to the support.

The conical member that has a small diameter end and a large diameter end preferably faces with the large diameter end toward the second section connected to the pallet. In this particular embodiment, the small diameter end of the conical member is rigidly secured to the supports, for example, by a screw.

In another embodiment the large diameter end of the conical member faces away from the second section that is connected to the pallet, whereby the housing is rigidly secured to the support and the conical member is movable relative to the housing. In this embodiment an especially large footing or contact surface is provided between the conical member and the housing rigidly secured to the support.

In order to prevent the conical member to rotate with the screw bolt forming the coupling member, a torque lock is interposed between the housing and the conical member in such a way that the above mentioned relative movement between the housing and the conical member is possible, at least in the radial direction, but preventing rotational movement.

As mentioned, screws are used for securing the first section to the support and the second section to the pallet. However, other connecting devices may be used, for example, clamping devices.

The free end of the screw bolt, and preferably also the inlet end of the female threading, either in the housing or in the conical member, should be provided with leading or guide ramps formed by slanting surfaces. Preferably, a conical recess forms the lead end to the female threading in the housing or conical member and a slanted ramp forms the lead-in or guide surface of the coupling member in the form of a screw bolt.

The screw bolt forming the coupling member passes through a throughbore in the second section secured to the pallet. Preferably, the throughbore forms a guide for the coupling bolt.

The relative rotation of the coupling bolt, once it is in the tightened position, should preferably be prevented by an arresting device such as a spring biased ball or screw or the like. Thus, the screw bolt will be held in position so that an unintended loosening is avoided once the screw bolt has been tightened.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
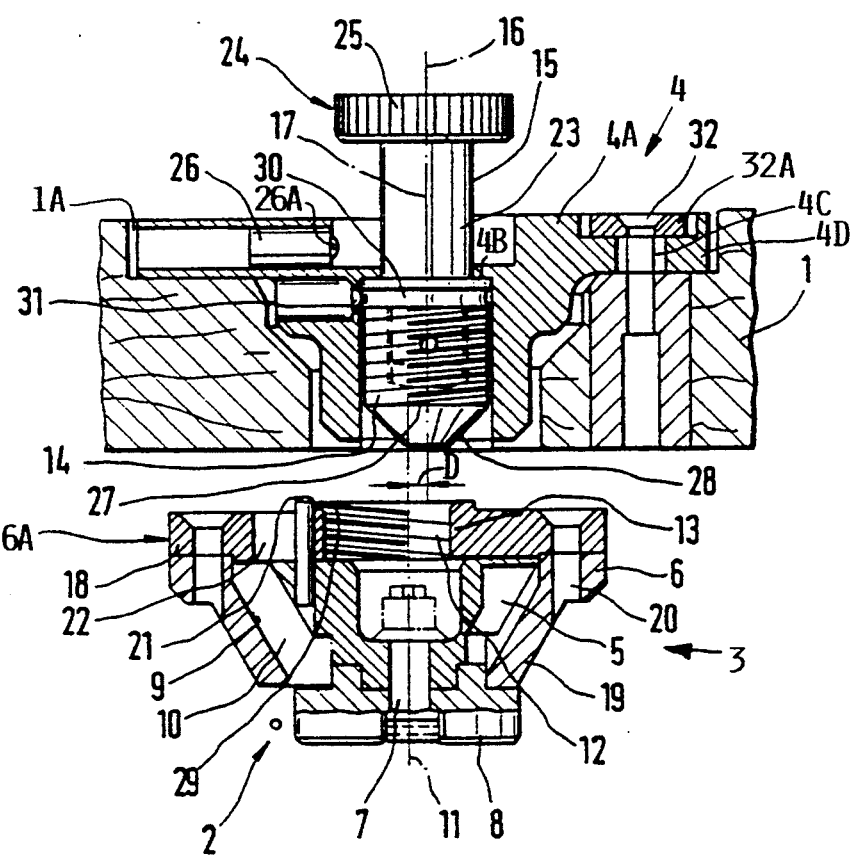
FIG. 1 shows a cross-sectional view through an aligning and connecting mechanism of a first embodiment according to the invention, whereby the longitudinal central axis of the first section is shown to be horizontally displaced by a displacement D relative to the longitudinal central axis of the second section and of the coupling member.

FIG. 1 shows the present alignment and connecting mechanism in a state prior to connecting a pallet 1 to a support 2. The support 2 is merely shown as a rail 8 forming part, for example, of a floor structure in an aircraft not shown. The present mechanism comprises a first or lower section 3 and a second or upper section 4. The first section 3 comprises a conical member 5 which is rigidly connected to the rail 8 by a bolt and nut connection 7. The first section 3 further comprises a housing 6 confining an inner space 10 with conical walls 9 in which the conical member 5 is received with substantial play to permit relative movement between the conical member 5 and the housing 6 in the inner space 10. More specifically, the housing 6 prior to coupling the first section 3 to the second section 4 is free to move radially relative to the conical member 5 and axially relative to the central longitudinal axis 11 of the first section 3.

The housing 6 has a cover 6A rigidly secured to the housing 6 by a plurality of screws 20. The cover 6A has a central bore 13 with a female threading 12 and a slanted or conical guide inlet 29 into the bore 13 to be described in more detail below.

Figure 4:
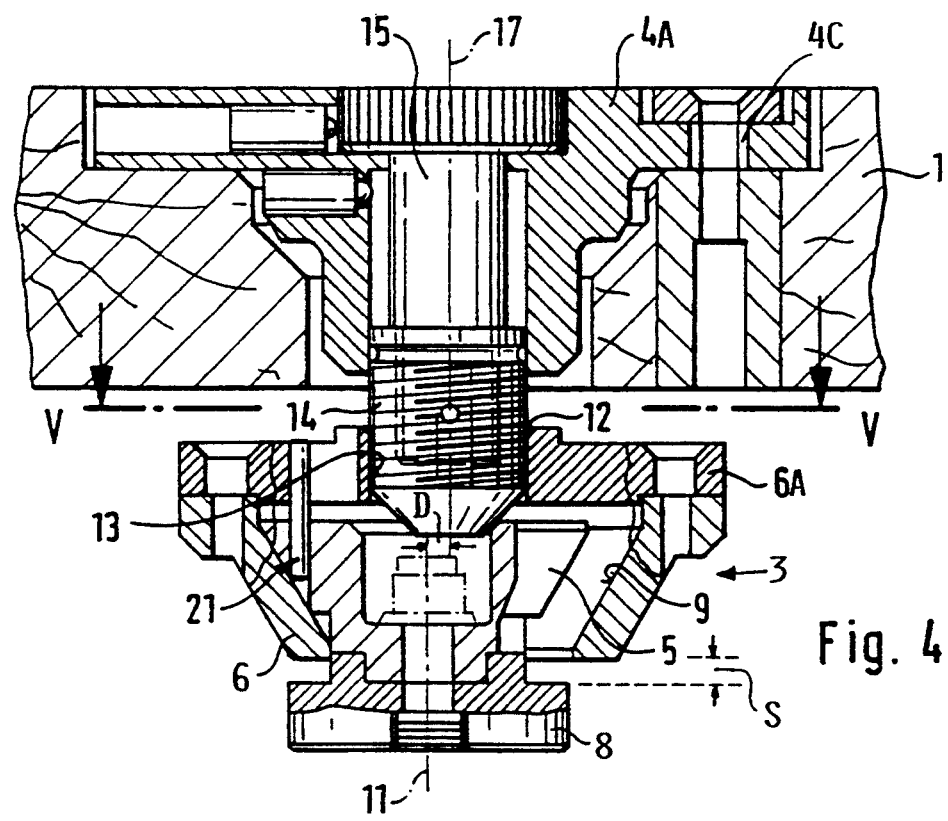
FIG. 4 is a view similar to that of FIG. 3, but illustrating that the coupling bolt has been threaded into a female threading of the housing of the first section to such an extent that the conical tip of the coupling or tightening bolt begins to engage a conical surface of the conical member.

By properly dimensioning the inner space 10 with its conical walls 9 as well as the conical member 5 relative to each other, the required radial play is provided for the adjustment of the conical member 5 inside the space 10 as will be described below. However, it is preferable to also provide a relative axial displacement between the conical member 5 and the housing 6 to facilitate the adjustment. Such axial displacement S is shown in FIG. 4.

In the embodiment of FIGS. 1 to 7 the conical member 5 has a small diameter end facing downwardly, and a larger diameter end facing upwardly toward the second section 4. However, in the second embodiment of FIGS. 8 and 9, the conical member 5 faces downwardly with its large diameter end and upwardly with its small diameter end. The centering and interlocking effect is the same in both embodiments.

The upper section 4 comprises a body 4A with a throughbore in which a coupling member 15 is received and guided. In the embodiments the coupling member 15 is a screw bolt having a shaft end 23 with a central axis 16 and a free end carrying a male threading 14 for cooperation with the female threading 12 in the bore 13 of the cover 6A of the housing 6 of the first section 3. The body 4A has a central longitudinal axis 17 that coincides with the central longitudinal axis 16 of the shaft 23. Prior to alignment, as shown in FIG. 1, a radial or horizontal displacement D exists between the central longitudinal axis 11 of the first section 3 and the axes 16 and 17. The construction of the present connector is such that this displacement D is compensated or rather substantially eliminated when the sections 3 and 4 are coupled to each other by the operation of the coupling member 15 as will be described below.

Figure 5:
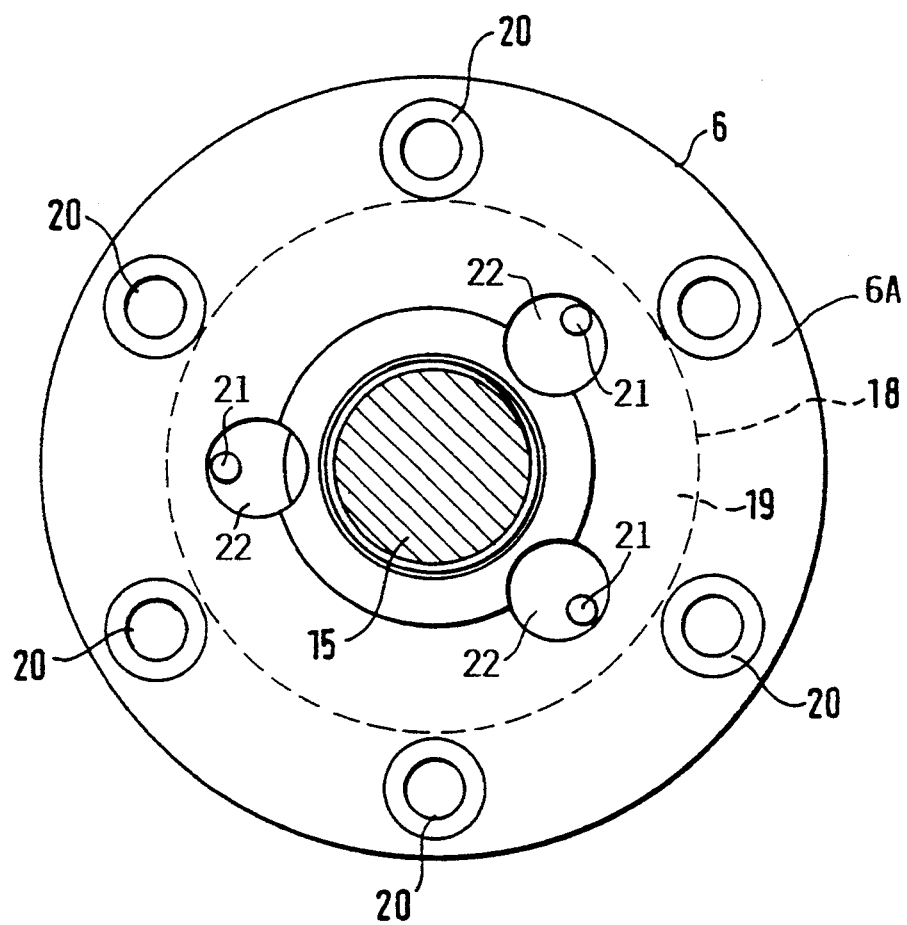
FIG. 5 is a sectional view along section plane V—V in FIG. 4, whereby the slight displacement D visible in FIG. 4 is not shown in FIG. 5 for simplicity's sake.

The above mentioned cover 6A of the housing 6 sits tightly on a shoulder 18 of the housing 6 and the screws 20 do not permit any play between the housing 6 and its cover 6A. A torque lock in the form of one or several pins 21 is inserted between the housing cover 6A and the conical member 5. The pin or pins 21 are fixed in respective bores of the conical member 5 and reach into holes 22 in the cover 6A, as shown in FIG. 5. These holes 22 are large enough to permit the displacement of the housing 6, 6A relative to the conical member 5, especially in the radial direction. On the other hand, the pins 21 are long enough to also permit the axial displacement between the conical member 5 and the housing 6, 6A as shown in FIG. 4.

The coupling element 15 is a threaded bolt having a shaft 23 with a longitudinal axis 16 that coincides with the longitudinal axis 17 of the second section 4. The bolt 15 has a head 24 at its upper end that is provided with ratchet teeth 25 which help to rotate the bolt 15. When a valley between two neighboring ratchet teeth 25 is engaged by a spring biased ball 26A of an arresting device 26 mounted to the body 4A of the second section 4, further rotation is prevented. Instead of a spring biased ball, a spring biased pin 26A may be used for this purpose.

Figure 2:
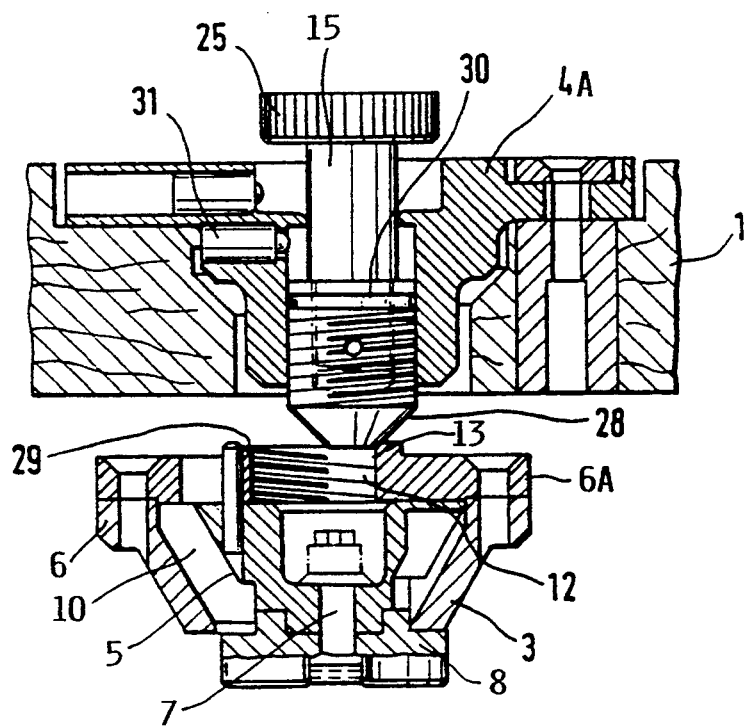
FIG. 2 is a sectional view as in FIG. 1, however, showing the beginning of an alignment and connecting operation.

The shaft 23 carries at its end facing toward the first section 3 the above mentioned male threading 14. Preferably, the male threading 14 is provided on a sleeve 27 that is rigidly secured to the lower end of the shaft 23 and the downward end of which is provided with a guide ramp 28. Rather than providing the threading 14 on a sleeve, the lower end of the shaft 23 may itself be threaded to form a screw provided with the guide ramp 28 at its lower end portion for engaging a conical lead-in or guide inlet 29 into the bore 13 provided with the female threading 12 in the cover 6A of the housing 6. Preferably, the sleeve 27 has a dead-end hole in which the lower end of the shaft 23 is rigidly secured. The conical inlet 29 of the bore 13 has preferably the same slant as the conical guide ramp 28 as best seen in FIG. 2 for facilitating the cooperation of the ramp 28 with the conical inlet 29 in the axial alignment of the sections relative to each other.

The coupling member 15 or rather its threaded sleeve 27 is provided with a circumferential groove 30 positioned for cooperation with an arresting member 31 of the same construction as the above described arresting member 26. A spring biased ball engages the groove 30 to prevent an unintended axial displacement of the coupling member 15 in the body 4A. A shoulder 4B prevents an axial withdrawal of the coupling member 15 out of the body 4A. However, the spring bias of the arresting member 31 permits an intended downward pushing of the coupling member 15.

The screws 32 passing through washers 32A and oversized holes 4C in a flange 4D of the body 4A secure section 4 to the pallet 1. Play provided by the oversized holes 4C relative to the diameter of the screws 32 permits a certain radial adjustment of the body 4A in a correspondingly oversized recess 1A in the pallet 1.

As shown in FIG. 1, the first section or base section 3 is radially displaced with its central axis 11 by a displacement D relative to the central longitudinal axis 16, 17 of the second section 4 and the coupling member 15. In this starting position the arresting member 31 holds the coupling member 15 in the position shown in FIG. 1, whereby the threaded bushing 27 is recessed in a guide throughbore within the body 4A.

FIG. 2 shows that the coupling member 15 has been pushed downwardly, whereby the arresting member 31-or rather its spring biased ball, has been disengaged from the groove 30. The conical guide ramp 28 of the coupling member now begins to engage the conical inlet 29 into the bore 13 with the female threading 12.

Figure 3:
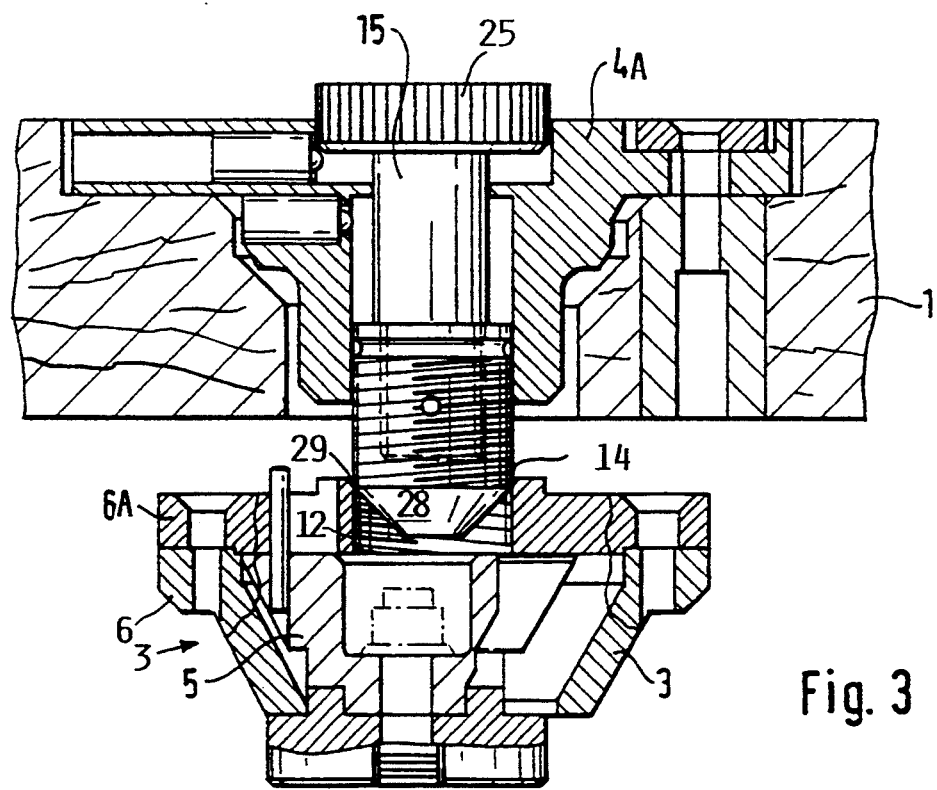
FIG. 3 is a sectional view showing a further stage of the alignment, wherein the housing of the first section has been displaced relative to the position of the conical member of the first section, whereby the resulting alignment now permits the tightening of the pallet to the floor.

FIG. 3 shows that the cooperation of the conical guide ramp 28 with the conical inlet 29 under the influence of a continuous downward axial force applied to the head 25 of the coupling member 15, has shifted the housing 6 with its cover 6A radially to the right, thereby permitting the engagement of the male threading 14 with the female threading 12, as shown in FIG. 3.

FIG. 4 shows the further threaded engagement between the male threading 14 and the female threading 12. Rotation between the housing 6, 6A and the coupling member 15 is prevented by the above mentioned pins 21 forming a torque lock. As the threading engagement continues, the housing 6, with its fixed cover 6A is lifted relative to the conical member 5 so that an axial spacing S is formed between the bottom edge of the housing 6 and the respective facing shoulder of the rail 8. As the lifting of the housing 6 begins, the displacement D between the axes 11 and 17 is still there. However, as the threaded engagement continues, the axial spacing S increases as shown in FIG. 6 and the radial displacement D diminishes until it substantially disappears, whereby the axes 11, 16, and 17 substantially coincide with each other for a consistently repeatable precise positioning of the pallet.

Figure 6:
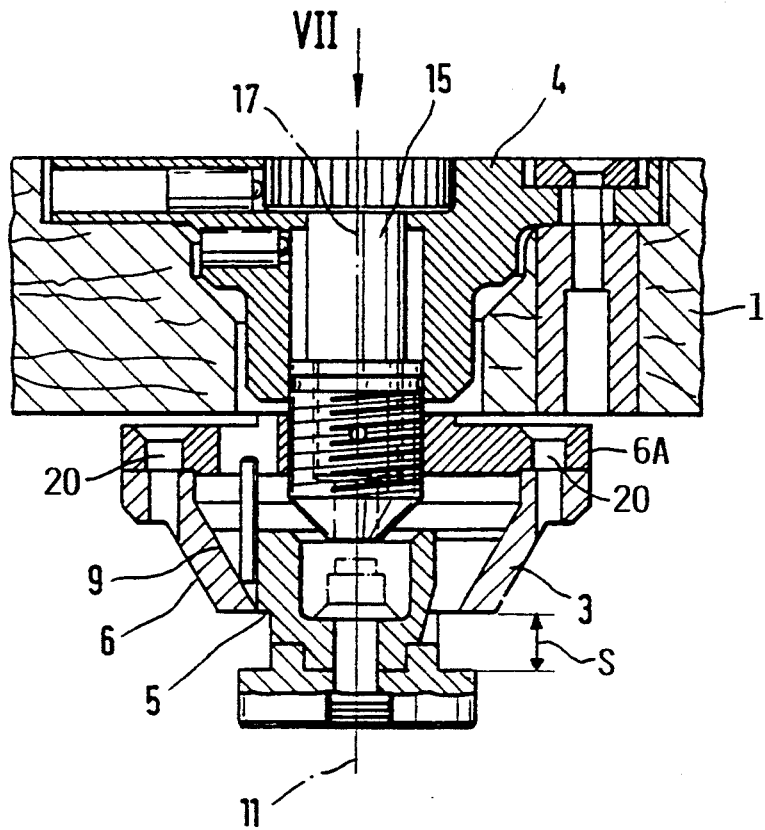
FIG. 6 shows a view similar to that of FIG. 4, however after further tightening of the coupling bolt so that the longitudinal axes of the bolt and those of the first and second sections coincide with each other.

The end position shown in FIG. 6 shows that the coupling member 15 has been tightened in such a way that the two sections 3 and 4 are rigidly connected to each other. In this position the outer conical wall of the conical member 5 engages the inner conical wall 9 of the housing 6, whereby a sufficiently precise or exact centering of the coupling mechanism and thus a precise positioning of the pallet 1 is assured. As mentioned, the axes 11, 17, and 16 substantially coincide when the tightening is completed, and neighboring pallets will not form any gaps therebetween. The just described engagement of the outer conical wall of the conical member with the inner conical wall 9 of the housing 6 thus performs an alignment function simultaneously with a tightening function.

FIG. 5 shows a sectional view in the direction of the section plate V—V in FIG. 4, however, after the just described alignment has been accomplished as shown in FIG. 6, whereby the torque lock pins 21 are uniformly or rather symmetrically distributed. FIG. 5 further shows that the screws 20 which connect the cover 6A to the housing 6 or rather to the side wall 19 of the housing 6 are distributed substantially along a circle.

Figure 7:
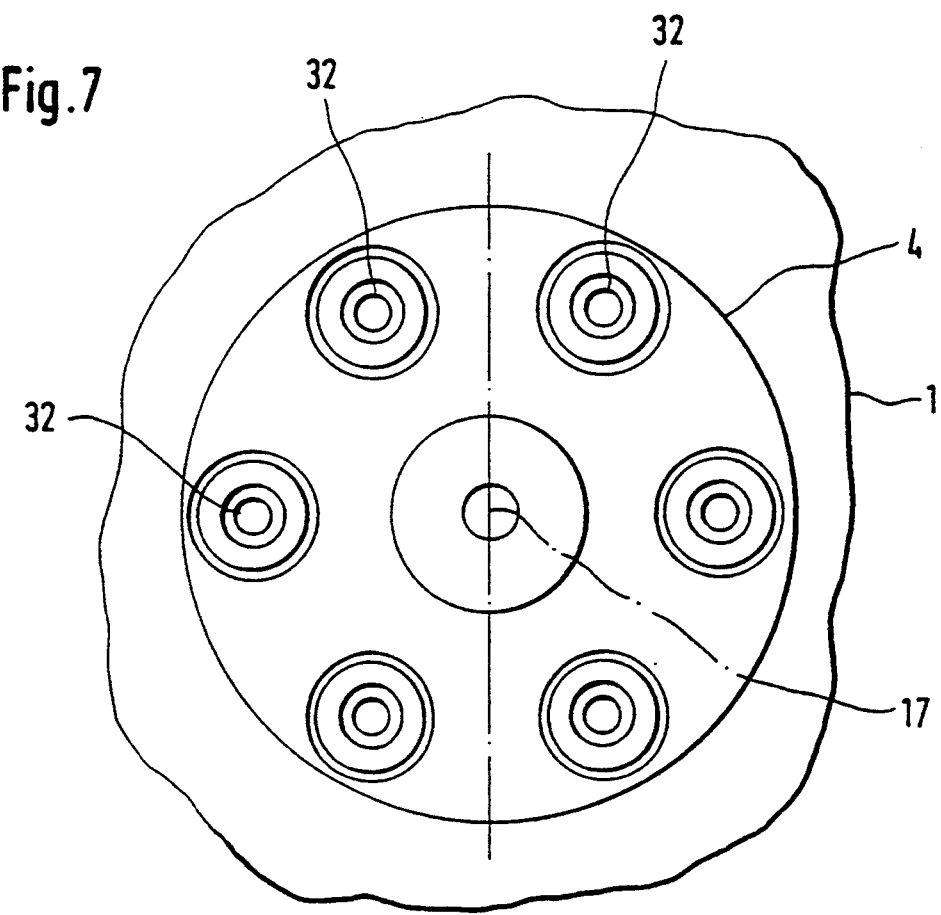
FIG. 7 is a view in the direction of the arrow VII in FIG. 6.

FIG. 7 shows that the screws 32 which connect the second section 4 to the pallet 1 are also arranged substantially along a circle concentric to the longitudinal axis 17, which extends perpendicularly to the plane of the drawing in FIG. 7.

Figure 8:
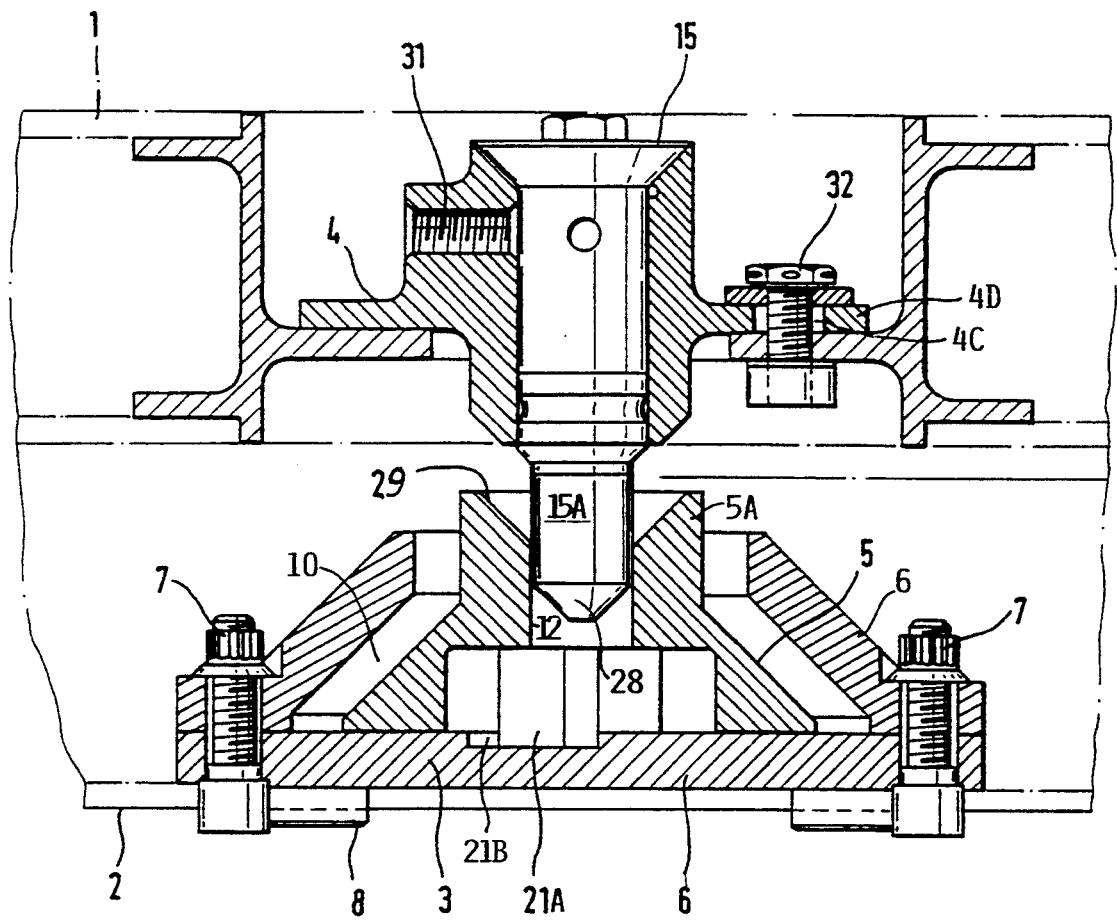
FIG. 8 is a view similar to that of FIG. 1, but showing a different embodiment in which the housing of the first section is rigidly secured to the support structure, while the conical member is movable relative to the housing in the radial and axial direction.
Figure 9:
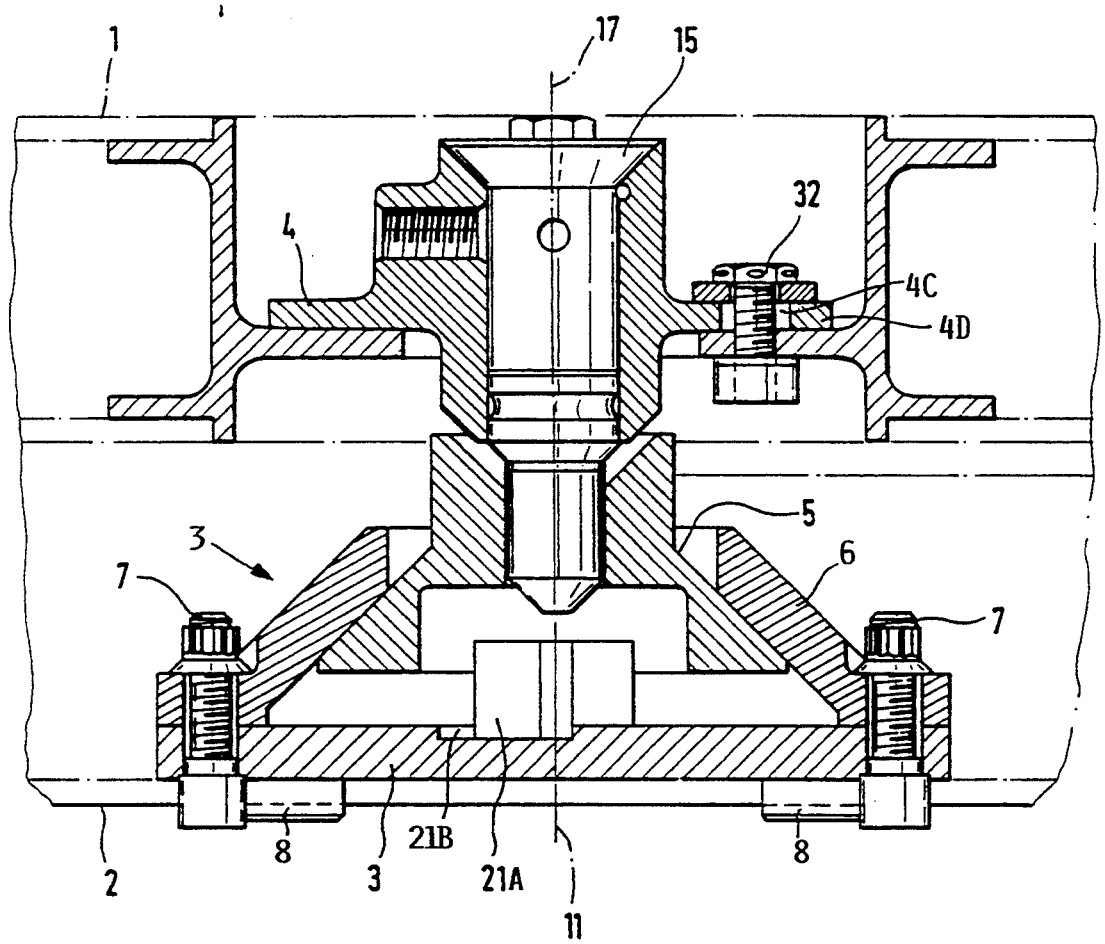
FIG. 9 shows the second embodiment in a sectional view similar to that of FIG. 8, however, just prior to the completion of the tightening.

FIGS. 8 and 9 illustrate a second embodiment of the invention, whereby the same components have received the same reference numbers. In FIG. 8 the housing 6 is bolted to the rails 8 of the support 2 by the bolt and nut connections 7. Thus, the central axis of the housing 6 is stationary relative to the support 2. The conical member 5 on the other hand is movable relative to the housing 6 in a radial direction, as well as in an axial direction. For this purpose the space 10 in the housing 6 is sufficiently larger for the axial movement and also for a required radial movement of the conical member 5 inside the housing 6. The conical member 5 extends upwardly with its small diameter end 5A that is preferably formed as a cylindrical extension of the conical walls of the conical member 5. The upper end 5A of the cylindrical extension is provided with the conical inlet 29 as in the first embodiment. The large diameter end of the conical body 5 in the position shown in FIG. 8 wherein the simultaneous alignment and tightening is not yet complete, rests on the floor of the housing 6, thereby providing a large surface area contact between the housing 6 and the conical member 5. A threaded end 15A of the coupling member 15 engages a female threading 12 of the conical member 5, whereby the cooperation of the ramp 28 with the conical inlet 29 functions in the same way as described above with regard to the first embodiment. A torque lock 21A slidingly engages the conical member 5 and prevents its rotation relative to the housing 6 in which the torque lock 21A engages a recess 21B which is sufficiently large to permit the radial movement of the member 5 relative to the housing 6.

FIG. 9 shows that the continued engagement of the threads 12 and 15A has lifted the conical member 5 sufficiently to rigidly couple the first section 3 with the second section 4. The conical member 5 has been displaced sufficiently so that the axis 11 and the axis 17 substantially coincide with each other. The operational procedure is substantially the same as described above with reference to FIGS. 1 to 7.

Although the invention has been described with reference to specific example embodiments it will be appreciated that it is intended to cover all modifications and equivalents within the scope of the appended claims.

What we claim is:

1. An apparatus for simultaneously aligning and securing a pallet to a support, comprising a first section having a first central axis, said first section comprising a housing having an inner conical wall, and a conical member having an outer conical wall facing said inner conical wall with an initial play for a radial and axial relative displacement between said conical member and said housing, a female threading with a lead-in surface, and a first connector for securing said first section to said support, said apparatus further comprising a second section having a second central axis, said second section comprising a central bore coaxial with said second central axis, and a second connector for securing said second section to said pallet, said apparatus further comprising a threaded bolt axially displaceable and rotatable in said central bore of said second section, said threaded bolt having a guide ramp at one end, an operating head at its other end, and a male threading next to said guide ramp, said guide ramp cooperating with said lead-in surface of said first section for guiding said threaded bolt with its male threading into said female threading, whereby said outer conical wall of said conical member and said inner conical wall of said housing cooperate with each other in response to an axial force applied by tightening said threaded bolt to simultaneously align said first and second central axes with each other and to secure said pallet to said support by eliminating said initial play.

2. The apparatus of claim 1, wherein said conical member of said first section is rigidly secured to said support by said first connector, and wherein said housing of said first section is free within said initial play for said radial and axial displacement before said tightening is completed.

3. The apparatus of claim 1, wherein said conical member of said first section is free within said initial play for said radial and axial displacement before said tightening is completed and wherein said housing of said first section is rigidly secured to said support by said first connector.

4. The apparatus of claim 1, wherein said conical member of said first section has a large diameter end and a small diameter end, said large diameter end facing toward said second section connected to said pallet by said connector, and wherein said first connector secures said small diameter end of said conical member to said support.

5. The apparatus of claim 1, wherein said conical member has a large diameter end and a small diameter end, said large diameter end facing said support, and wherein said first connector secures said housing to said support.

6. The apparatus of claim 1, further comprising a torque lock operatively interposed between said housing and said conical member for preventing relative rotation between said housing and said conical member.

7. The apparatus of claim 1, wherein said housing of said first section has a bore with said female threading of said first section for engagement with said male threading of said threaded bolt.

8. The apparatus of claim 7, wherein said housing of said first section comprises a housing cover, a third connector rigidly but releasably connecting said cover to said housing, said bore with said female threading passing through said cover, said lead-in surface surrounding an inlet end of said bore in said cover.

9. The apparatus of claim 1, wherein said conical member of said first section has a central bore with said female threading, said housing of said first section having an opening through which said central bore with its female threading is accessible for said threaded bolt.

10. The apparatus of claim 1, wherein said threaded bolt has a large diameter section guided in said central bore of said second section, and a free end threaded section for engaging said female threading which is provided in said conical member of said first section.

11. The apparatus of claim 1, further comprising in said second section an arresting device (26) for securing said threaded bolt against unintended rotation.

12. The apparatus of claim 11, wherein said arresting device comprises a ball or screw for holding said threaded bolt in a tightened position.

13. The apparatus of claim 1, wherein said second connector for securing said second section to said pallet comprises a flange connected to said second section, oversized through holes in said flange, and screws passing through said oversized screw holes into said pallet, whereby said oversized through holes provide an adjustment play prior to tightening.

14. The apparatus of claim 1, further comprising in said second section an arresting member (31) for securing said threaded bolt against unintended axial displacement.

* * * * *